(12) United States Patent
Lopez Martinez

(10) Patent No.: US 11,167,711 B2
(45) Date of Patent: Nov. 9, 2021

(54) AIRBAG DEPLOYMENT DATA COLLECTION

(71) Applicant: Faurecia Interior Systems, Inc., Auburn Hills, MI (US)

(72) Inventor: Carlos Gerardo Lopez Martinez, Puebla (MX)

(73) Assignee: FAURECIA INTERIOR SYSTEMS, INC., Auburn Hills, MI (US)

(*) Notice: Subject to any disclaimer, the term of this patent is extended or adjusted under 35 U.S.C. 154(b) by 126 days.

(21) Appl. No.: 16/280,463

(22) Filed: Feb. 20, 2019

(65) Prior Publication Data

US 2020/0262380 A1 Aug. 20, 2020

(51) Int. Cl.
*B60R 21/2165* (2011.01)
*B60R 21/015* (2006.01)
*B60R 21/017* (2006.01)

(52) U.S. Cl.
CPC .... *B60R 21/01504* (2014.10); *B60R 21/0173* (2013.01); *B60R 21/01508* (2014.10); *B60R 21/2165* (2013.01)

(58) Field of Classification Search
CPC .......... B60R 21/01504; B60R 21/2165; B60R 21/01508; B60R 21/0173; B60R 21/01218; G01D 5/25; G01N 2203/0066; Y10T 428/15
USPC ............... 280/735, 728.3; 701/45; 428/43
See application file for complete search history.

(56) References Cited

U.S. PATENT DOCUMENTS

| | | | |
|---|---|---|---|
| 5,850,085 A | 12/1998 | Rosenbluth | |
| 7,131,662 B2 | 11/2006 | Fisher et al. | |
| 8,558,707 B1* | 10/2013 | Kim | G01K 5/72 340/601 |
| 2002/0063417 A1* | 5/2002 | Merrifield | B60R 21/2165 280/732 |
| 2004/0025091 A1* | 2/2004 | Totman | G01N 3/066 714/47.1 |
| 2005/0263991 A1 | 12/2005 | Fisher et al. | |
| 2006/0028006 A1* | 2/2006 | Fisher | B60R 21/276 280/735 |
| 2006/0041309 A1* | 2/2006 | Massen | A61M 1/1055 623/14.13 |
| 2006/0175817 A1 | 8/2006 | White et al. | |

OTHER PUBLICATIONS

Definition of "record", Merriam-Webster, https://www.merriam-webster.com/dictionary/record, Nov. 19, 2020.*

* cited by examiner

*Primary Examiner* — Keith J Frisby
(74) *Attorney, Agent, or Firm* — Reising Ethington P.C.

(57) ABSTRACT

Airbag deployment data is collected using a plurality of sensors located along a line of weakening formed in a vehicle interior panel. The sensors are configured to provide information pertinent to separation of adjacent portions of the panel from each other as a function of time at a plurality of locations along the line of weakening. Each sensor is attached to the panel so that the sensor crosses the line. The relative time at which a conductive part of each sensor breaks is recorded and provides useful information about airbag door behavior during airbag deployment.

20 Claims, 3 Drawing Sheets

AIRBAG DEPLOYMENT DATA COLLECTION

TECHNICAL FIELD

The present disclosure is related generally to vehicle airbag systems and, more particularly, to the collection of data during airbag deployment.

BACKGROUND

Vehicle airbags deploy from behind a panel in the vehicle passenger cabin during a collision to prevent vehicle occupants from being propelled against less forgiving materials, such as glass, steel, etc. The time scale at which vehicle airbags operate is on the order of milliseconds. For example, once airbag deployment is initiated, the airbag begins to inflate, breaks through the interior panel, bears the inertial load of a vehicle occupant, and then begins to deflate—all in about $1/10^{th}$ of a second. This can make the study of airbag behavior somewhat difficult since human vision cannot process information that quickly. Even more difficult is the behavior of the door or lid that opens to allow the airbag through the panel, since the airbag begins breaking through the interior panel during the first 10% of that time—i.e., in about $1/100^{th}$ of a second. Those tasked with designing airbag systems and the panels through which airbags deploy must often rely on high-speed cameras to record airbag deployment for later study to make design iterations. Such cameras must have higher frame rates than typical vehicle crash test cameras, such as about 5000 fps or higher.

For example, U.S. Pat. No. 5,850,085 to Rosenbluth discloses an airbag test fixture that relies on high-speed imaging. The apparatus records airbag envelope throw on three axes by illuminating a grid of photo-transistors with a light source, then inflating the airbag between the light source and the grid. The system essentially tracks the leading edge of the shadow cast by the airbag to help determine the airbag shape and speed during inflation. The test fixture records about 5000 images per second, but it provides no information about the behavior of an interior panel through which the airbag must deploy when installed as part of the vehicle.

SUMMARY

An illustrative airbag deployment data collection system includes a vehicle interior panel, a plurality of sensors, and a recorder. The vehicle interior panel includes a line of weakening along which a first portion of the panel separates from a second portion of the panel to permit an airbag to deploy through a deployment opening formed in the panel along the line of weakening during airbag deployment. Each sensor is configured to detect separation of the panel portions from each other at one of a plurality of spaced apart locations along the line of weakening. The recorder is configured to record the separation of the panel portions from each other at each location with respect to time.

In some embodiments, each sensor is configured to break during airbag deployment, and the recorder is configured to record a time at which each sensor breaks.

In some embodiments, each sensor includes a first end affixed to the first portion of the panel and a second end affixed to the second portion of the panel such that each sensor is positioned across the line of weakening.

In some embodiments, the recorder is configured to record an electrical characteristic of each sensor with respect to time. The electrical characteristic is indicative of the separation of the panel portions from each other.

In some embodiments, each sensor includes an electrical conductor that crosses the line of weakening to complete a circuit to which the recorder is connected, and an open-circuit condition is indicative of the separation of the panel portions from each other.

In some embodiments, each sensor includes a metallic foil having a first portion affixed to the first portion of the panel and a second portion affixed to the second portion of the panel. The recorder is electrically connected to each of the first and second portions of the metallic foil.

In some embodiments, each metallic foil comprises a third portion between the first and second portions of the foil. The third portion is configured to break in response to the separation of the panel portions from each other, thereby creating an open-circuit condition indicative of the separation.

In some embodiments, the third portion of the metallic foil has a width that is less than a width of the first and second portions of the foil.

In some embodiments, the vehicle interior panel includes a substrate and a decorative covering overlying the substrate with each sensor being affixed to the substrate.

In some embodiments, each sensor is located between the substrate and the decorative covering.

In some embodiments, the first portion of the panel is surrounded by the second portion of the panel such that the first portion forms an airbag door that opens within the second portion during airbag deployment to form the deployment opening.

In some embodiments, each sensor has a first side and an opposite second side, each first side being electrically common with one another and each second side being electrically isolated from one another.

An illustrative method of collecting airbag deployment data includes the steps of deploying an airbag and obtaining information. The airbag is deployed through a deployment opening formed through a vehicle interior panel. The information is obtained from a plurality of sensors located along a boundary of the deployment opening. The information is indicative of separation of an airbag door from a surrounding portion of the panel at a plurality of spaced apart locations along the boundary.

In some embodiments, the information includes a time at which the sensor detected the separation at each location.

In some embodiments, each sensor comprises an electrical conductor extending across the boundary before the step of deploying, and each conductor is configured to break during the step of deploying.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described below is a system and method for collecting airbag deployment data, which may include temporal data indicating the relative times as which different portions of an airbag door break away from a surrounding portion of the vehicle interior panel through which the airbag deploys. This information can instantly provide a timing profile related to the progression of airbag door separation and opening without the need for expensive high-speed imaging equipment and without the expenditure of time required to conduct frame-by-frame analysis of video footage to determine how and when the airbag breaks through the panel during deployment. While the deployment data collection is described herein as an aid in pre-production airbag testing, the system and method may be useful with airbag systems installed in consumer-operated vehicles to provide data for use in post-crash analysis.

Figure 1:
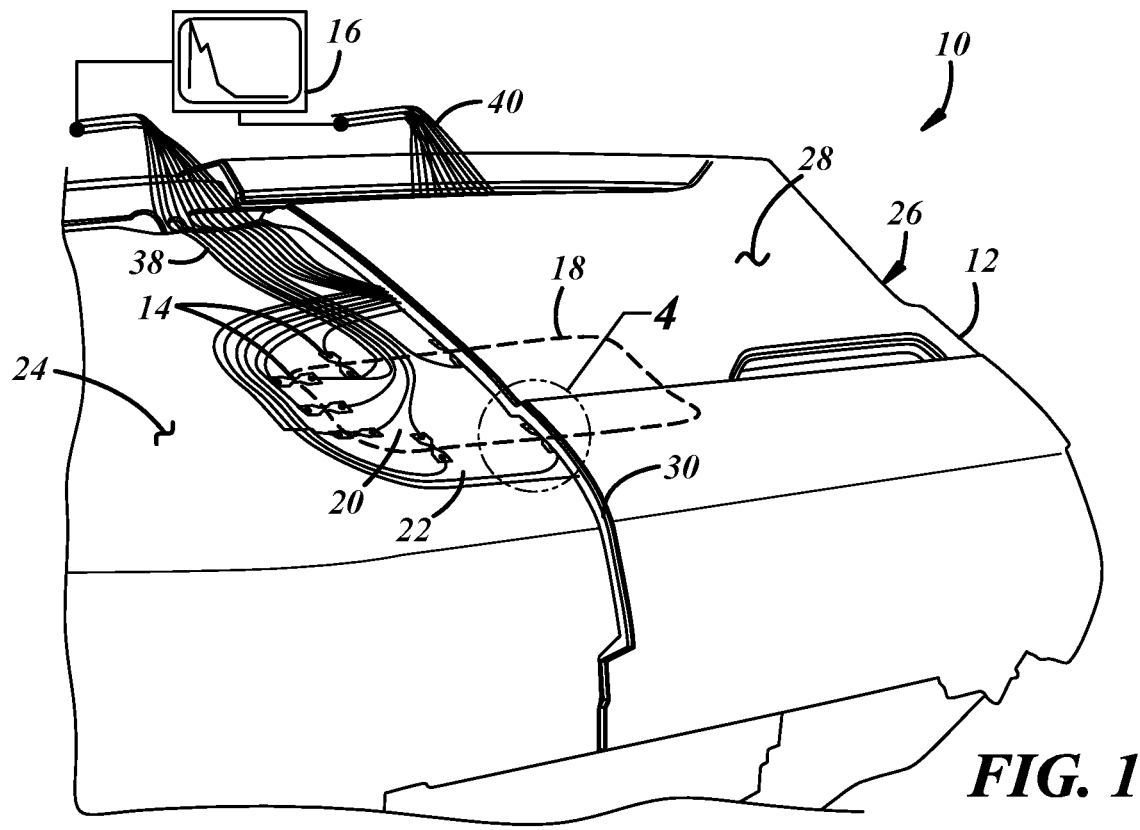
FIG. 1 is a cutaway view of a portion of an airbag deployment data collection system.

FIG. 1 is a cutaway view of an illustrative system 10 for collecting airbag deployment data. The system 10 includes a vehicle interior panel 12, a plurality of sensors 14, and a recorder 16. The sensors 14 are arranged along a line of weakening 18 formed in the panel 12. The line of weakening 18 represents a boundary along which a first portion 20 of the panel 12, such as an airbag door, separates from a second adjacent portion 22 of the panel to form a deployment opening in the panel through which the airbag deploys. Each sensor 14 is configured to detect separation of the panel portions 20, 22 from each other at one of a plurality of spaced apart locations along the line of weakening 18. The recorder 16 is configured to record the separation of the panel portions 20, 22 from each other at each location with respect to time.

The illustrated panel 12 is a vehicle instrument panel including a substrate 24 and a decorative covering 26 overlying the substrate. The substrate 24 provides the overall shape, size, and underlying structure of the panel 12 and may be formed from a polymer-based composite or any other suitably rigid material. The decorative covering 26 includes a decorative skin layer 28 that faces the interior of a vehicle passenger cabin when installed in a vehicle, as well as an interlayer 30 between the substrate 24 and skin layer. The decorative skin layer 28 is a relatively thin layer that provides the visual and tactile aesthetic of the panel and may be constructed from leather, a polymer-based film, a textile, or other suitable material. The interlayer 30 may be provided as a cushioning layer to lend an upholstery-like feeling to the decorative covering 26. Polyurethane foam and 3D-spacer fabric are examples of materials from which the interlayer 30 may be formed. In some cases, the covering 26 is omitted or has more or less layers than illustrated in FIG. 1. The system 10 is applicable to any vehicle panel that opens to permit an airbag to deploy through it (e.g., steering wheel panel, seat panel, door panel, etc.).

The line of weakening 18 is depicted as a broken line in the figures and represents the location of a line along which the panel 12 is configured to break, split, or otherwise separate under the force of the deploying airbag to form a deployment opening through the panel. In this example, the line of weakening 18 is formed in the substrate 24 as one or more stress concentrators along the underside of the substrate. For instance, the substrate 24 may be mechanically scored or laser scored along the line of weakening 18, or a continuous or discontinuous notch can be molded into or machined into the substrate. In other examples, the line of weakening 18 is defined by a slot formed through the substrate 24 with material bridges spaced along the slot. The decorative covering 26 may also include a line of weakening formed in one or more of its individual layers, or at least a portion of the line of weakening 18 in the substrate 24 can extend through the substrate and into the decorative covering.

In this case, the first portion 20 of the panel 12 becomes an airbag door or lid during airbag deployment and is surrounded by the second portion 22 of the panel prior to deployment. The first portion 20 is generally rectangular and can be configured to maintain a hinged connection with the surrounding portion 22 of the substrate 24 or to detach from the surrounding portion on all four sides. The line of weakening 18 can be U-shaped to form a hinged airbag door, H-shaped to form a pair of hinged doors that open away from each other, X-shaped to form four triangular doors that open away from the center of the X, or any other suitable shape along which a deployment opening can be formed.

The sensors 14 are operably connected with the recorder 16, which is illustrated schematically here. The recorder 16 can be any type of data collection and/or recording device that logs the relative time at which each individual sensor 14 indicates that the first and second portions 20, 22 of the panel 12 have separated at the respective sensor location. Time of panel separation at each sensor location may be recorded relative to separation at other sensor locations and/or relative to the time at which a triggering signal is sent to or received by the airbag module. The recorder 16 may be a computer, a dedicated electronic data-logging device, or a chart recorder, for example.

In the illustrated embodiment, each sensor 14 is piece of electrically conductive material, such as copper, arranged to cross the boundary defined by the line of weakening 18—e.g., the boundary between the portion 20 of the panel 12 that forms the airbag door and the surrounding portion 22 of the panel. These sensors 14 may be referred to as break sensors because, when the airbag deploys, each sensor breaks into separate pieces as the first and second portions 20, 22 of the panel 12 separate from each other. The recorder 16 logs the relative time at which each sensor 14 breaks, thereby providing a timing profile for the formation of the deployment opening.

Figure 2:
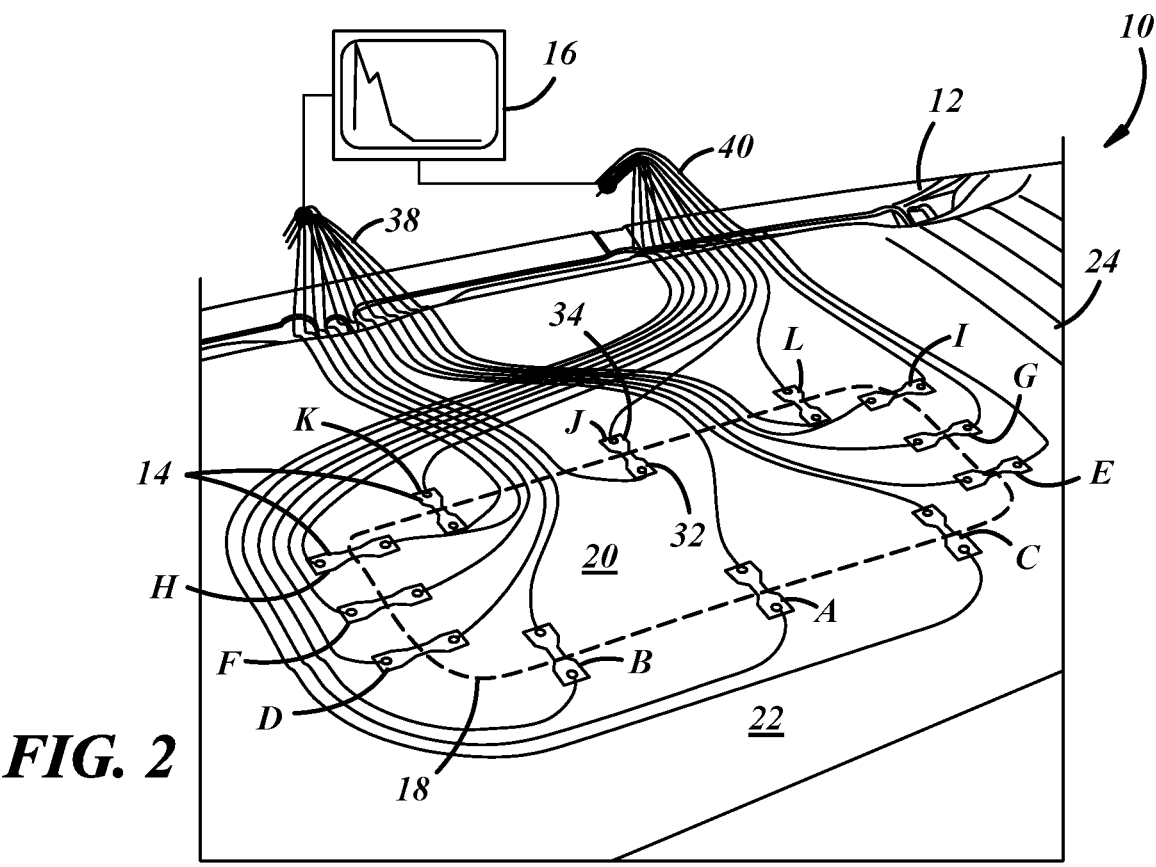
FIG. 2 is a view of the system of FIG. 1 with the decorative covering omitted.
Figure 3:
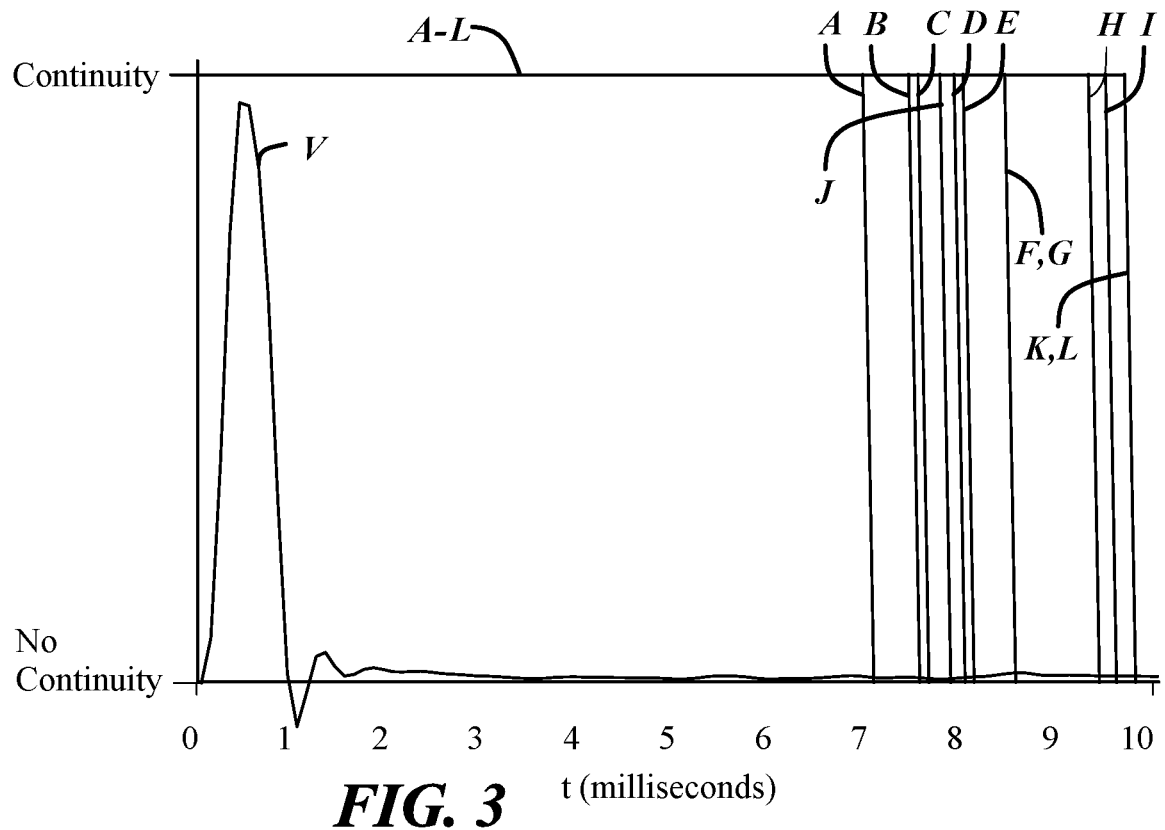
FIG. 3 is an example of a chart illustrating the state of electrical continuity of the sensors of FIG. 2 with respect to time.

An example of a timing profile is illustrated in FIG. 3 based on the sensor configuration of FIG. 2. FIG. 2 illustrates the system of FIG. 1 with the decorative covering 26 omitted in order to show all of the sensors 14, of which there are twelve labeled in FIG. 2 as letters A-L. A first end 32 of each sensor 14 is located along and affixed to the first portion 20 of the substrate 24, and a second opposite end 34 of each sensor is located along and affixed to the second portion 22 of the substrate, directly across the line of weakening 18 from the first end 32.

FIG. 3 charts an electrical property of each sensor 14 on the vertical axis versus time in milliseconds on the horizontal axis. Airbag squib voltage (V) or an arbitrary magnitude is superimposed on the chart as a reference time indicator. The particular electrical characteristic of the sensors illustrated in the chart of FIG. 3 is the state of electrical continuity across the sensor—i.e., across the opposite ends 32, 34 of each sensor. This is a simple electrical characteristic to monitor and/or record because there are only two states of continuity—i.e. electrical continuity is either present or not present. The absence of electrical continuity across one of the sensors is indicative of the separation of the panel portions 20, 22 from each other at the location of that sensor, while the presence of continuity is indicative that separation has not yet occurred at that location.

In this example, the squib voltage (V) peaks at about 0.5 milliseconds, at which time electrical continuity is present across all of the sensors (A-L). Continuity is present at all of the sensors (A-L) until approximately 7 milliseconds, at which time one of the sensors (A) breaks, thereby altering the state of continuity to an open-circuit condition in which electrical continuity is no longer present across the sensor (A) located along a front edge and near the center of the airbag door. The next two sensors (B, C) to break are located along the front edge of the airbag door on either side of the front-center sensor (A). This is followed by breakage of the sensor (J) along a rear edge of the airbag door, then by sequential breakage of sensors (D-I) along opposite side edges of the airbag door, from front-to-rear, and finally by breakage of the other two sensors (K, L) along the rear edge. All of the sensors A-L break within a timespan of less than 3 milliseconds, with the relative break times captured and recorded for analysis. FIG. 3 is of course only an example of a test result, which may be unique for individual data collection events and system configurations.

Electrical continuity may be viewed as a condition in which current flow is present across each individual sensor such that zero current flow indicates an open-circuit condition. Continuity may also be viewed and or measured as electrical resistance across each sensor, where continuity is indicated as a very low resistance (e.g., near-zero) and an open-circuit condition is indicated as essentially infinite resistance. Other electrical or non-electrical properties may be monitored and/or recorded as well.

Information gleaned from a profile such as that of FIG. 3 may include the time elapsed between airbag trigger and the beginning of separation of the panel 12 along the line of weakening 18, the time elapsed between airbag trigger and full formation of the deployment opening, the time elapsed between the beginning of separation of the panel and full formation of the deployment opening, and the sequence of locations along the line of weakening at which the airbag door separates from the surrounding portion of the panel. This information can help airbag system and interior panel designers make design changes based on non-subjective information and without the need for expensive high-speed imaging equipment. For example, while a test engineer may suspect that the center of the rear edge of the airbag door separates from the surrounding portion of the panel before the side edges separate, based on frame-by-frame analysis of high-speed video footage, the above-described data collection system provides objective data confirming the sequence of locations of separation.

Figure 4:
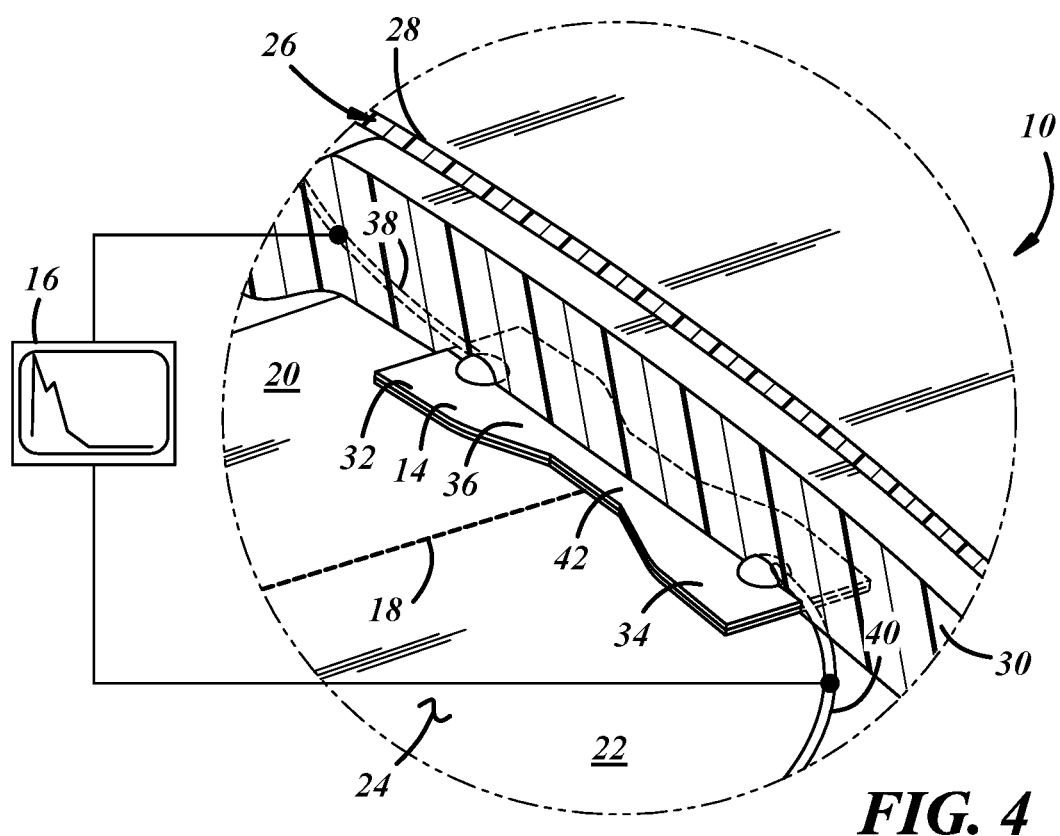
FIG. 4 is an enlarged view of a portion of the system of FIGS. 1 and 2 illustrating an individual sensor.

FIG. 4 is an enlarged view of a portion of the exemplary system 10 of FIGS. 1 and 2 illustrating an exemplary sensor 14. The illustrated sensor 14 is located along and positioned across the line of weakening 18 with its first end 32 affixed to the first portion 20 of the panel and its second end 34 affixed to the second portion 22 of the panel. In this case, the sensor is affixed along the side of the substrate 24 that faces the decorative covering 26. In other examples, the sensors 14 are affixed along the opposite or underside of the substrate 24. Alternatively or additionally, sensors 14 may be affixed to the decorative covering 26, such as along the face of the interlayer 30 facing the substrate 24, between the interlayer and the skin layer 28, or along the outer surface of the skin layer.

Each sensor 14 may include an electrical conductor 36 that crosses the line of weakening 18 to complete at least a portion of a circuit to which the recorder 16 is connected. In one embodiment, the electrical conductor 36 is or includes a layer of metallic foil (e.g., copper) affixed to the substrate 24 by a layer of adhesive. In the illustrated example, first and second electrical leads 38, 40 electrically connect each sensor 14, in particular each metallic foil 36, to the recorder 16. In this manner, the recorder 16 can monitor and/or record the desired electrical property of the sensor. Connections between the sensor 14 and the leads 38, 40 may be made by welding, soldering or other suitable method.

The illustrated sensor 14 includes a stress-concentrator in the form of a third or central portion 42 that has a width less than that of the first and second end portions 32, 34. In this example, the sensor 14 has a dog bone shape similar to that of a tensile test specimen with the narrower central portion 40 designed to break rather than the ends 32, 34. Other stress-concentrators such as notches may be used instead or additionally.

In one particular embodiment, each sensor 14 is a copper foil 36 having a thickness between 40 µm and 80 µm and is adhered to the substrate 24 across the line of weakening 18 with a 20-40 µm thick adhesive layer. The foil material elongates by about 4% to 7% prior to breaking, and any suitable adhesive material may be used, as long as the foil breaks at an applied load that is less than the load at which the adhesive bond breaks. This will ensure that the foil breaks to indicate separation of the panel portions. With the above-mentioned 40-80 µm copper foil as the sensor, an adhesive that can withstand about 1.5 to 2.0 kg/25 mm has been found sufficient. The sensors 14 may optionally include a layer of insulating material (e.g., polyester-imide or other suitable polymer) over the conductive layer 36.

Each of the electrical leads 38, 40 can be formed from any suitable conductor, such as insulated copper wire. In one example, enameled copper wire having a diameter of about 0.2 mm and a resistance of less than 50 mΩ/m has been found suitable. The insulating material for the leads 38, 40 may be a polyester-imide or any other suitable material. These material types, sizes, and shapes for the conductive portion of the sensors and electrical leads are non-limiting.

Figure 5:
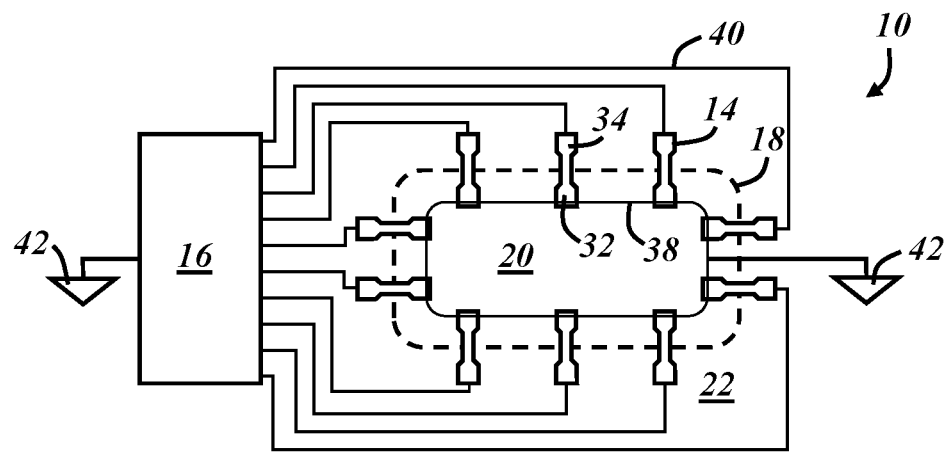
FIG. 5 is a diagrammatic view of the data collection system with one side of the plurality of sensors being electrically common.

In the example of FIGS. 1-4, each individual sensor 14 has a dedicated set of first and second electrical leads 38, 40 connecting it with the recorder 16. In other embodiments, one side of each sensor is electrically common with the same side of all the other sensors—i.e., the side of each sensor affixed to the same separable portion of the panel. FIG. 5 diagrammatically illustrates such an example in which ten sensors 14 are spaced along the line of weakening 18. The first side 32 of each sensor 14 is electrically connected to the others by a common first lead 38, which is connected with a recorder common 42, while the second side 34 of each sensor is isolated from the others and connected to a dedicated channel of the recorder 16. This configuration simplifies the electrical wiring necessary to implement the system 10.

Figure 6:
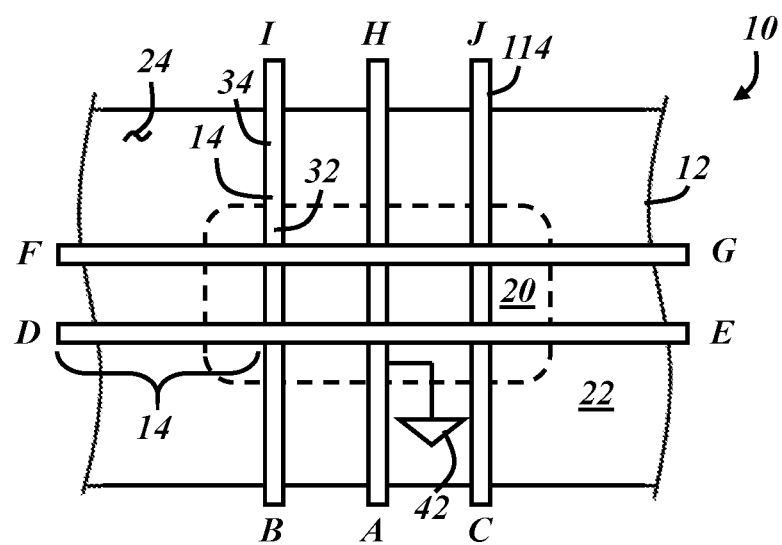
FIG. 6 is a schematic view of the data collection system in which conductive strips are arranged to form the sensors.

The example of FIG. 6 also implements an electrically common first side 32 for all of the sensors 14 for connection with a recorder common 42. In this embodiment, each sensor is formed as part of an electrically conductive strip 114 affixed to the substrate 24 such that each strip crosses the boundary formed by the line of weakening 18. In this example, each strip 114 crosses the line of weakening twice—i.e., once on each opposite side of the first portion 20 of the panel. In this manner, each strip effectively forms two individually operable sensors 14. The first end 32 of each sensor 14 is defined where the strip 114 joins one or more other strips within the area of the first portion 20 of the panel 12, and the second end of each sensor is defined along the same strip on the opposite side of the line of weakening 18. In some cases, an individual sensor 14 can be defined by the entire portion of a strip 114 between the point at which it meets the electrical common and an access point (A-J) to which the recorder can be connected to monitor and/or record the state of electrical continuity between the electrical common 42 and each individual access point.

The illustrated configuration can be constructed by adhering or otherwise attaching a plurality of strips 114 to the substrate 24 such that each strip crosses the line of weakening at least once and at least one of the strips crosses the line of weakening twice. The strips 114 are arranged in such a way that they are all electrically joined within the area of the first portion 20 (e.g., the airbag door) and such that each strip is electrically isolated from the others within the area of the second surrounding portion 22. The strips 114 may extend beyond edges of the substrate as shown. The decorative covering can then be disposed over the instrumented substrate 24 in any suitable manner, such as via a back-fill foaming process or a leather or leatherette wrap process. Ends of the strips 114 are thereby made accessible for electrical connection with a recorder.

In this example, one single strip 114 defines two sensors with access points (e.g., B and I) at opposite ends. Electrical continuity can be monitored and/or recorded separately at these access points—i.e., even after the strip 114 breaks at one location along the line of weakening 18 to create an open-circuit condition at sensor B, continuity is maintained at sensor I until the strip breaks along the other side of the airbag door. The strips 114 may be formed from the same types of materials noted above, such as copper foil that is less than 100 µm thick. Optionally, stress concentrators such as a notch or score line may be applied to each strip 114 at or near the line of weakening to ensure the strip breaks in the desired location.

It should be noted that the sensors 14 are not limited to break sensors. Any sensor that can identify the time at which adjacent portions of the panel separate from each another at a given location can be used. Armed with the teachings herein, skilled artisans may adapt other types of sensors to be used in an equivalent manner to study airbag deployment behavior in a more objective and less expensive and time-consuming way.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An airbag deployment data collection system, comprising:
   a vehicle interior panel comprising a line of weakening along which a first portion of the panel separates from a second portion of the panel to permit an airbag to deploy through a deployment opening formed in the panel along the line of weakening during airbag deployment;
   a plurality of sensors, each sensor being configured to detect separation of said portions from each other at one of a plurality of spaced apart consecutive locations along the line of weakening; and
   a recorder configured to record said separation at each location with respect to a reference time, the reference time being a time before any of the plurality of sensors detects said separation,
   wherein the sensors are arranged consecutively at the consecutive locations along the line of weakening and the system is configured to provide a timing profile from which a user can determine an amount of time after the reference time that each of the plurality of sensors detects said separation and a sequence in which the plurality of sensors detects said separation when the sequence is nonconsecutive with respect to the arranged sensors and the spaced apart locations, and
   wherein the sensors are arranged along the panel in a pattern having at least two dimensions.

2. The system of claim 1, wherein each sensor is configured to break during airbag deployment, the recorder being configured to record a time at which each sensor breaks.

3. The system of claim 1, wherein each sensor comprises a first end affixed to the first portion of the panel and a second end affixed to the second portion of the panel such that each sensor is positioned across the line of weakening.

4. The system of claim 3, wherein the first and second ends of one of the sensors are spaced apart in a direction that is different from a direction in which the first and second ends of another one of the sensors is spaced apart.

5. The system of claim 1, wherein the recorder is configured to record an electrical characteristic of each sensor with respect to time, said electrical characteristic being indicative of said separation.

6. The system of claim 1, wherein each sensor comprises an electrical conductor that crosses the line of weakening to complete a circuit to which the recorder is connected, an open-circuit condition being indicative of said separation.

7. The system of claim 1, wherein each sensor comprises a metallic foil having a first portion affixed to the first portion of the panel and a second portion affixed to the second portion of the panel, the recorder being electrically connected to each of the first and second portions of the metallic foil.

8. The system of claim 7, wherein each metallic foil comprises a third portion between the first and second portions of the foil, the third portion being configured to break in response to said separation, thereby creating an open-circuit condition indicative of said separation.

9. The system of claim 8, wherein the third portion has a width that is less than a width of the first and second portions of the foil.

10. The system of claim 7, wherein each sensor is individually adhered to the panel via an individual adhesive layer.

11. The system of claim 10, wherein the adhesive layer comprises an adhesive material such that the metallic foil breaks at an applied load that is less than a load at which the adhesive bond breaks.

12. The system of claim 1, wherein the vehicle interior panel comprises a substrate and a decorative covering overlying the substrate, each sensor being affixed to the substrate.

13. The system of claim 12, wherein each sensor is located between the substrate and the decorative covering.

14. The system of claim 1, wherein the first portion of the panel is surrounded by the second portion of the panel such that the first portion forms an airbag door that opens within the second portion during airbag deployment to form said deployment opening.

15. The system of claim 1, wherein each sensor has a first side and an opposite second side, each first side being electrically common with one another and each second side being electrically isolated from one another.

16. The system of claim 1, wherein the sensors are arranged along a perimeter of the deployment opening to provide said timing profile so the user can determine at which location along the perimeter said separation first occurs and at which location and in what sequence each subsequent separation occurs with respect to each other.

17. The system of claim 1, wherein the reference time is a squib voltage peak time.

18. A method of collecting airbag deployment data using the system of claim 1, the method comprising the steps of:
    deploying the airbag through the deployment opening formed through the vehicle interior panel;
    obtaining information from the plurality of sensors located along a boundary of the deployment opening, said information being indicative of separation of an airbag door from a surrounding portion of the panel at the plurality of spaced apart locations along said boundary.

19. The method of claim 18, wherein said information includes a time at which the sensor detected said separation at each location.

20. The method of claim 18, wherein each sensor comprises an electrical conductor extending across the boundary before the step of deploying, each conductor being configured to break during the step of deploying.

* * * * *